July 19, 1966   N. E. RANK ETAL   3,261,245
PRECISION ADJUSTMENT TOOL MOUNTING UNIT
Filed March 16, 1964
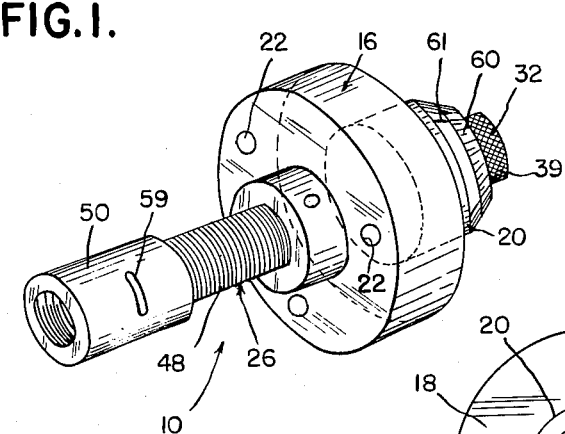
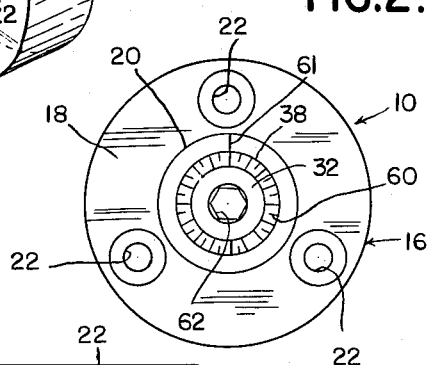
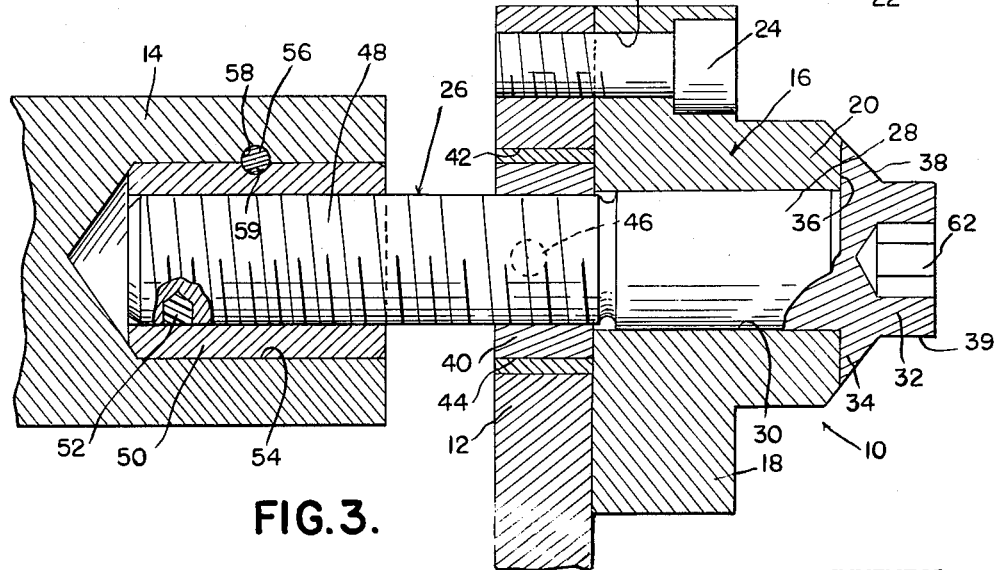
INVENTORS
NORMAN E. RANK
WALTER F. MOTT
BY
ATTORNEYS United States Patent Office 3,261,245
Patented July 19, 1966

3,261,245
PRECISION ADJUSTMENT TOOL
MOUNTING UNIT
Norman E. Rank, 3062 Middleton Court, Birmingham, Mich., and Walter F. Mott, 23142 Rosedale Court, St. Clair Shores, Mich.
Filed Mar. 16, 1964, Ser. No. 351,973
6 Claims. (Cl. 82—36)

The present invention relates to improvements in a precision mounting unit for tools of various types, for example, the tool mounting holder of a lathe, although the invention is applicable to various other types of cutter in machine tools calling for a high precision repeated positioning of a cutter in relation to a workpiece. In a typical example, the mounting unit of the invention may be used to great advantage in the highly accurate repositioning of a tool holder carrying an indexable, throwaway type cutting insert or tip, following indexing and/or replacing of the latter, or employing a re-sharpenable cutter, following a sharpening of the latter.

It is an object of the invention to provide an improved and very simple yet highly accurate adjustable mount for the holder of cutters of these general types which will insure that, once the tool has been accurately set for the precision turning or other cut on a workpiece, it may always, after indexing or sharpening of the cutter bit, be precisely returned to the same exact setting, without error resulting in reject waste.

More specifically, the precision adjustable mounting unit of the invention takes the form of a base or body piece having means to rigidly and fixedly mount the same upon a movable or adjustable part of a machine tool, such as the tool post fixedly carried by a radial slide of the tool traverse assembly of a lathe. Such base or body rotatively mounts, under very close tolerance axial limitation, an adjusting stem, which at one axial end thereof has precision threaded engagement in an adapter sleeve, which sleeve is in turn fixedly engaged with the holder of the tool in question. Thus, the stem, as rotatively manipulated for a course or fine adjustment, and as axially restrained at the tool slide post, can effect a corresponding coarse or fine adjustment of the tool holder and its tool to compensate for error which may have arisen as the result of indexing or replacement of a cutting insert, or re-sharpening of a tool bit held thereby.

In further accordance with the invention, the adjustment stem referred to is provided at its axial end opposite its threaded end with an enlarged fingerpiece, which coacts with a collar fixedly secured to the stem in closely restraining axial movement of the stem in relation to the mounting piece or body, through a bore of which the stem extends; and, still further, the fingerpiece is externally and circumferentially calibrated, as in divisions of 0.001 inch, to enable the degree of adjustment to be very closely controlled, for purposes which will appear.

In general, it is an object of the invention to provide a mounting unit for a tool holder or the like, since applications of structures equivalent to the subject mount in arts other than the machine tool art will suggest themselves, which eliminates the need for an excessively time-consuming operation in re-locating a tool or like mounted piece in working relation to a workpiece, once a previously adjusted precision setting is disturbed. The unit of the invention makes a precision resetting possible in a quick, easy and reliable fashion by a relatively unskilled operator.

The foregoing as well as other objects will become more apparent as this description proceeds, especially when considered in connection with the accompanying drawing illustrating the invention, wherein:

FIG. 1 is a perspective view of the improved precision adjustment mounting unit of the invention;

FIG. 2 is an axial end view of the unit, as from the right of FIG. 1; and

FIG. 3 is a fragmentary view in enlarged scale on a radial and longitudinal plane through the axis of the unit, showing the latter as operatively associated with a tool post and tool holder of a machine tool.

The unit of the invention is generally designated 10; and the machine tool part with which it is operatively associated, as shown in FIG. 3, may typically comprise an upright support post 12 of a radially and longitudinally or axially traversable slide of a lathe, which in a conventional manner holds or restrains a conventional tool or cutter holder 14 against movement in relation to the post 12 and slide when the tool is in operation.

The holder 14 may be one for a releasable clamping of a known type of throw-away, indexable tungsten carbide tip or insert, or it may be an older style holder for a resharpenable cutter bit. In either case, difficulty may be experienced in replacing the insert after indexing or the bit after sharpening, in a way to insure repeated precision re-engagement with a workpiece after the replacement; and to do so has in the past called for exacting and time-consuming adjustment on a trial and error or gauging basis. This is true whether the tool is one of a turning lathe, or other type of boring, shaping or planing equipment and the simple provisions of the improved unit 10 obviate all of this.

Tool 10 comprises a mounting base piece or body 16 including a radially outwardly enlarged cylindrical flange 18 and an integral cylindrical formation 20 extending axially outwardly thereof, the flange 18 being provided with three equally spaced, countersunk bores 22 to receive flat head machine screws 24 by which body 16 is rigidly mounted to an outer side face of the tool post 12.

The reference numeral 26 generally designates an axially elongated stem or stud, which has a cylindrical barrel portion 28 rotatively mounted with close tolerance within a cylindrical central bore 30 of mounting body 16, and its outer axial end (right-hand in FIG. 3) is formed to provide an adjusting fingerpiece 32 having a radially outwardly extending circumferential flange 34. A flat, axially inner face of this flange radially over-extends and has axial abutting running engagement with a radial end face 36 of the body extension 20; and a frusto-conical outer surface 38 of flange 34 linearly merges with a flush frusto-conical surface of extension 20. Fingerpiece 32 is externally knurled at 39 for ease in finger operation.

Axially inwardly of the cylindrical barrel 28, the adjusting stem 26 extends through the bore of a restraining collar 40, which is rotatively journaled in a cylindrical opening 42 through the tool post 12, as by means of a bushing 44; and this collar is fixedly secured to the stem, as by a small set screw 46, the axial setting of the retaining or restraining collar 40 being such that it coacts with the flange 34 of fingerpiece 32 in preventing axial movement of stem 26 relative to tool post 12 and the unit's mounting body 16, as well as, in conjunction with bushing 44, in affording a rotary bearing for stem 26 in the bore of support 12.

The stem 26 along a considerable axial extent thereof to the left (FIG. 3) of its barrel portion 28, is provided with a very finely pitched thread formation 48, at which it threadedly engages the bore of a relatively elongated adapter sleeve 50; and prior to assembly of the sleeve 50 upon the stem threading 48, a small friction element, such as a "Nylok" plug 52, is inserted radially into the latter, for the purpose of exerting a degree of frictional resistance against the interior of adapter sleeve 50, such as will prevent a too loose relative rotation of the latter and stem 26.

In order to adapt the same for manipulation by the adjustment unit 10, the rear end of the tool holder (or an appropriate portion of any other type holder) is provided with a cylindrical, axially opening recess 54, into which the adapter sleeve, as mounted to the stem thread 48, fits with relatively close tolerance. In order to prevent any relative movement whatsoever of sleeve 50 and holder 14, as thus fitted together, a locking pin 56 may be inserted from the exterior into coacting semi-circular sectioned, mating side recesses 58, 59 of the respective holder and adapter, as shown in FIG. 3 and indicated in FIG. 1.

Referring to FIG. 2, the precision mounting unit 10 is shown therein as having its conical end surface 38 circumferentially finely calibrated at 60 in divisions of, say, 0.001 inch; and the flush mating surface of body extension 20 carries a reference mark 61 for coaction with the calibration 60. In addition, as shown in FIGS. 2 and 3, the end of fingerpiece 32 is formed to provide a hexagonal recess 62 for the reception of an Allen wrench in finally adjusting unit.

As appears clear, a coarse or fine rotative micrometer adjustment of fingerpiece 32 correspondingly rotates the stem 26, without any degree of axial play; and the thread 48 of the stud thus coarsely or finely adjusts the rotatively restrained tool holder 14 to the precise desired extent. Thus, in a typical type of use it is assumed that the tool of the holder 14 is initially clamped by and at the latter to make precision cuts in a given radial setting relative to a workpiece. When its insert or sharpenable bit has been replaced, as after indexing to present a new cutting surface of the former or after a sharpening of the bit, the slide (not shown) and the cutter re-clamped thereon are radially advanced to the prior setting. Upon observation of a trial cut it is usually found that the setting is improper, being usually too shallow; and the operator then simply makes a micrometer-like adjustment of the fingerpiece 32 to the exact extent of the error, as determined by reference to his drawing or specification. This resets the tool exactly for the intended precision dimension, and operation can resume with the insurance of repeated uniformity of precision in production.

Despite its compactness in size and relative inexpensiveness of production, the unit 10 of the invention is readily applied to existing machine tool structures as an auxiliary adjunct making possible a high degree of precision in production, coupled with a substantial saving in tool reset time.

What we claim as our invention is:

1. A precision adjustment mounting unit for a tool or like holder, comprising a relatively fixed support member, a body having means to mount the same in axially and rotatively fixed relation to said relatively fixed support member, said body having a bore therethrough, an adjustment stem rotatively mounted in said bore and provided with a radially enlarged end formation in rotative and axially abutting engagement wtih an end of said body outwardly of said bore, a bearing and retainer member separate from said body, said retainer member being journaled on said support member and coacting with said stem end formation and said support member in restraining the stem from axial movement in said bore and in providing a rotative bearing for the stem in the support member, said retainer member being fixedly secured to said stem on the end of said body opposite said stem head formation, and being in axially abutting and rotatable engagement with said opposite body end said stem having an axially elongated fine thread formed thereon, and an adapter member surrounding said stem, one of said support and adapter members being threadedly engaged by said stem thread for the axial adjustment of said adapter member upon rotation of said stem.

2. A precision adjustment mounting unit for a tool or like holder, comprising a relatively fixed support member, a body having means to mount the same in axially and rotatively fixed relation to said relatively fixed support member, said body having a bore therethrough, an adjustment stem rotatively mounted in said bore and provided with a radially enlarged end formation in rotative and axially abutting engagement with an end of said body outwardly of said bore, a bearing and retainer member separate from said body and surrounding said stem at the opposite end of said body, said retainer member coacting with said stem end formation and said support member restraining the stem from axial movement in said bore and in providing a rotative bearing for the stem in the support member, said retainer member being journaled in said support member and being fixed on said stem in axially abutting and rotatable engagement with said opposite body end, said stem having an axially elongated fine thread formed thereon, and an adapter sleeve surrounding said stem, said adapter sleeve being threadedly engaged by said stem thread for the axial adjustment of said sleeve upon rotation of said stem.

3. A precision adjustment mounting unit for a tool or like holder, comprising a relatively fixed support member, a body having means to mount the same to said relatively fixed support member, said body having a bore therethrough, an adjustment stem rotatively mounted in said bore and provided with a radially enlarged end formation in rotative and axially abutting engagement with an end of said body outwardly of said bore, a bearing and retainer member separate from said body and surrounding said stem at the opposite end of said body, said retainer member coacting with said stem end formation and said support member in restraining the stem from axial movement in said bore and in providing a rotative bearing for the stem in the support member, said retainer member being journaled in said support member and being fixed on said stem in axially abutting and rotatable engagement with said opposite body end, said stem having an axially elongated fine thread formed thereon, and an adapter sleeve surrounding said stem, said adapter sleeve being threadedly engaged by said stem thread for the axial adjustment of said sleeve upon rotation of said stem, said sleeve having means for connecting the same in fixed axial and radial engagement with said holder.

4. A precision adjustment mounting unit for a tool or like holder member, comprising a relatively fixed support member, a body having means to mount the same in axially and rotatively fixed relation to said relatively fixed support member, said body having a bore therethrough, an adjustment stem rotatively mounted in said bore and provided with a radially enlarged end formation in rotative and axially abutting engagement with an end of said body outwardly of said bore, and a bearing and retainer member separate from said body, said retainer member being journaled on said support member and coacting with said stem end formation and said support member in restraining the stem from axial movement in said bore and in providing a rotative bearing for the stem in the support member, said retainer member being fixedly secured to said stem on the end of said body opposite said stem head formation, and being in axially abutting and rotatable engagement with said opposite body end said stem having an axially elongated fine thread formed thereon, one of said support and holder members having means threadedly engaged by said stem thread for the axial adjustment of said holder member upon rotation of said stem.

5. A precision adjustment mounting unit for a tool or like holder, comprising a relatively fixed support member, a body having means to mount the same to said relatively fixed support member, said body having a bore therethrough, an adjustment stem rotatively mounted in said bore and provided with a radially enlarged end formation in rotative and axially abutting engagement with an end of said body outwardly of said bore, and a bearing and retainer collar separate from said body and surrounding said stem within said support member at the opposite end of said body, said collar being mounted on said stem in axially and radially fixed relation thereto, the collar axially abutting said opposite end of the body in rotatable engagement therewith and coacting with said stem end formation and said support member in restraining the stem from axial movement in said bore and in providing a rotative bearing for the stem in the support member, said stem having a fine thread formed thereon, said holder having means threadedly engaged by said stem thread for the axial adjustment of said holder upon rotation of said stem.

6. A precision adjustment mounting unit for a tool or like holder, comprising a relatively fixed support member, a body having means to mount the same to said relatively fixed support member, said body having a bore therethrough, an adjustment stem rotatively mounted in said bore and provided with a radially enlarged end formation in rotative and axially abutting engagement with an end of said body outwardly of said bore, a bearing and retainer collar separate from said body and surrounding said stem within said support member at the opposite end of said body, said collar being radially pinned to said stem in axially and radially fixed relation thereto, the collar axially abutting said opposite end of the body in rotatable engagement therewith and coacting with said stem end formation and said support member in restraining the stem from axial movement in said bore and in providing a rotative bearing for the stem in the support member, said stem having a fine thread formed thereon, and an adapter sleeve surrounding said stem, said adapter sleeve being threadedly engaged by said stem thread for the axial adjustment of said sleeve upon rotation of said stem, said sleeve having pin means approximately tangential thereof for connecting the same in fixed axial and radial engagement with said holder.

References Cited by the Examiner

UNITED STATES PATENTS

| | | | |
|---|---|---|---|
| 690,763 | 1/1902 | Parker | 82—36 X |
| 847,527 | 3/1907 | Thayer | 82—24 |
| 1,165,635 | 12/1915 | Swaim | 82—36 X |
| 1,439,190 | 12/1922 | Pritchard. | |
| 2,390,967 | 12/1945 | Swenson et al. | |
| 2,661,218 | 12/1953 | Snow et al. | |
| 2,852,966 | 9/1958 | Olson | 82—36 X |

WILLIAM W. DYER, JR., *Primary Examiner.*

L. VLACHOS, *Assistant Examiner.*